United States Patent [19]

Akema

[11] Patent Number: 5,401,132
[45] Date of Patent: Mar. 28, 1995

[54] SCREW GROMMET

[75] Inventor: Tsuyoshi Akema, Aichi, Japan

[73] Assignee: Emhart Inc., Newark, Del.

[21] Appl. No.: 116,439

[22] Filed: Sep. 3, 1993

[30] Foreign Application Priority Data

Sep. 4, 1992 [JP] Japan .............................. 4-062444 U

[51] Int. Cl.$^6$ ............................................... F16B 13/04
[52] U.S. Cl. ......................................... 411/38; 411/21
[58] Field of Search ...................... 411/21, 22, 34, 37, 411/38, 182, 508, 913

[56] References Cited

U.S. PATENT DOCUMENTS

| | | | |
|---|---|---|---|
| 2,964,989 | 12/1960 | Croessunt | 411/38 |
| 4,828,439 | 5/1989 | Giannozzi | 411/37 |
| 4,920,618 | 5/1990 | Iguchi | 411/508 |
| 5,173,025 | 12/1992 | Asumi | 411/182 |

FOREIGN PATENT DOCUMENTS

| | | | |
|---|---|---|---|
| 1270522 | 4/1972 | United Kingdom | 411/21 |
| 8701419 | 3/1987 | WIPO | 411/182 |

Primary Examiner—Flemming Saether
Attorney, Agent, or Firm—E. D. Murphy

[57] ABSTRACT

A screw grommet 1 which is capable of dealing with a change in the thickness of panel comprises a grommet member 3 and a holding member 2 to hold the grommet member. The holding member comprises a flange formed larger than a mounting hole of a panel 33 and a leg portion 4 which extends downward from the flange, is formed with, in its center, a space to receive the grommet member, and passes through the mounting hole of the panel so as to extend to the bottom side of the panel. The grommet member 3 comprises a head 17 which is fixed so as to be prevented from vertical movements when received in the leg portion of the holding member, a tubular portion 19 which is received vertically movably in the leg portion of the holding member and is formed with a hole for a tapping screw 5 to be screwed thereinto, and a pair of connection arms 20 which connect the tubular portion to the head and bend so as to project radially outwardly in mid portions 25 thereof when the tubular portion is brought closer to the head. When the tapping screw 5 is screwed in, the mid portions 25 of the connection arms 20 project outwardly to sandwich the panel 33 and an ornamental member 34 associatedly with the flange 6 to connect them together.

2 Claims, 8 Drawing Sheets

FIG. IA
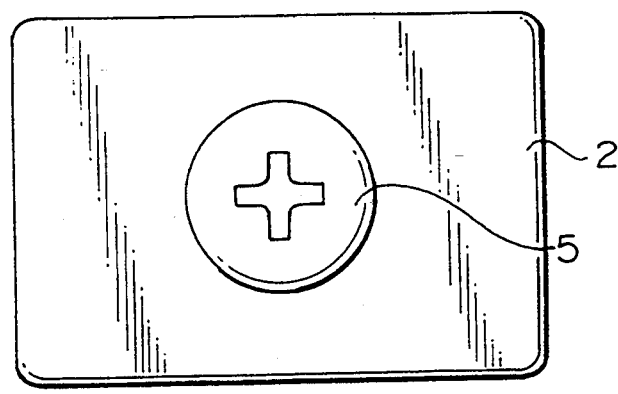
FIG. IB
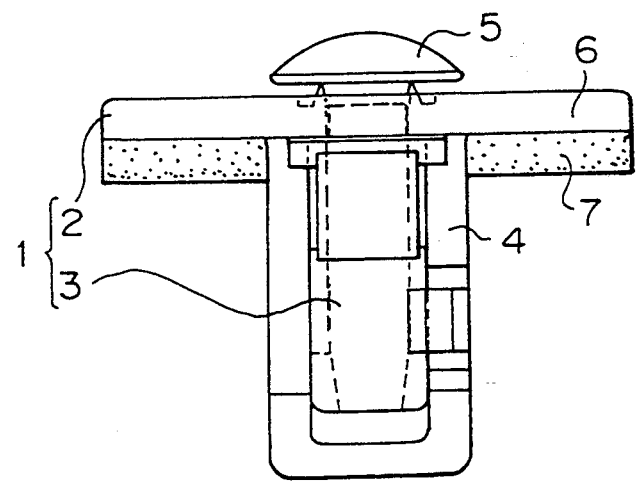
FIG. IC
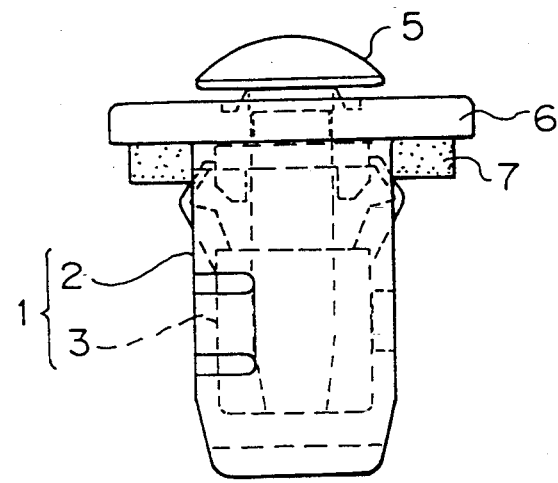

SCREW GROMMET

DESCRIPTION OF INVENTION

1. Field of Invention

The present invention relates to a screw grommet for use to connect a member such as an ornamental member to a vehicle body panel or the like by the use of a tapping screw or the like.

2. Prior Art

A screw grommet has a flange to be positioned on the surface and a shank extending to the other side. The shank is expanded in diameter when a tapping screw is screwed into it and the large diameter portion and the flange function to connect the screw grommet to a vehicle body panel so as to fasten an ornamental member together with the panel to connect the former to the latter or to fasten the ornamental member to the panel by means of the tapping screw. Such a screw grommet is used for mounting a member to a thin plate member such as a panel by the use of a screw member.

The conventional screw grommet is connected to the panel sandwiched between the portion of shank diametrically expanded by a screw member screwed thereinto and the flange. Therefore, the position of the large diameter portion of the shank has to be changed according to the panel thickness. This means that in case panels having different thicknesses are dealt with, numerous types of screw grommets of structures corresponding to the panels need to be prepared.

Accordingly, the present invention aims to provide a screw grommet which is capable of dealing with panels whose thicknesses are varied.

SUMMARY OF THE INVENTION

In order to attain the above-described object, according to the present invention, there is provided a screw grommet for connecting a first member to a second member such as a panel by the use of a tapping screw or the like, having a flange to be positioned on the surface of the second member and an opening to receive the shank of the screw member extending to the other side of the second member, being connected to the second member by means of the flange and the shank diametrically expanded when the screw member is screwed thereinto; characterized in that the screw grommet comprises a grommet member and a holding member to hold the grommet member, and the holding member comprises a flange which is formed larger than a mounting hole of the second member and a leg portion which extends downwardly from the flange, is formed with a space to receive the grommet member, and passes through the mounting hole of the second member so as to extend to the other side of the second member, the grommet member comprising a head which is fixed so as to be prevented from vertical movements when received in the leg portion of the holding member, a tubular portion which is received in the leg portion of the holding member vertically movably and is formed with a hole for the screw member to be screwed thereinto, and a pair of connection arms which connect the tubular portion to the head and whose mid portions bend so as to project radially outwardly when the tubular portion is brought closer to the head.

BRIEF DESCRIPTION OF ACCOMPANYING DRAWINGS

FIG. 1 shows an embodiment of the screw grommet of the present invention, (A) is a plan view, (B) a front view and (C) is a side view.

Figure 15A:
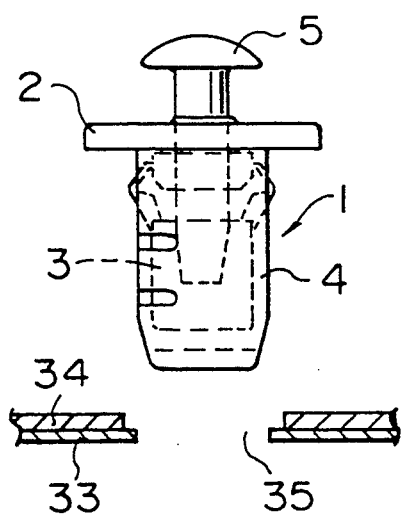
Figure 15B:
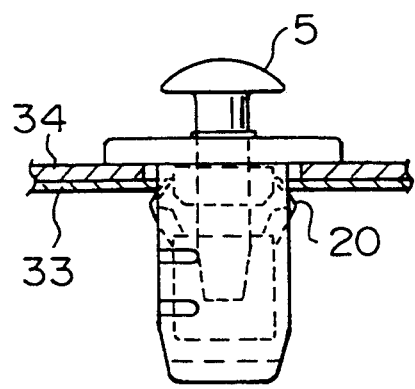
Figure 15C:
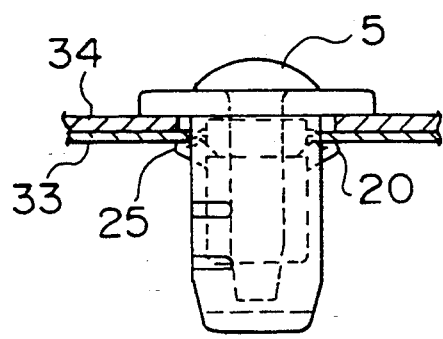

FIG. 15 showing steps of attaching an ornamental member to a panel by means of the screw grommet of FIG. 1, (A) shows them before attachment, (B) in the temporarily fixed state, and (C) after permanent attachment.

Figure 16:
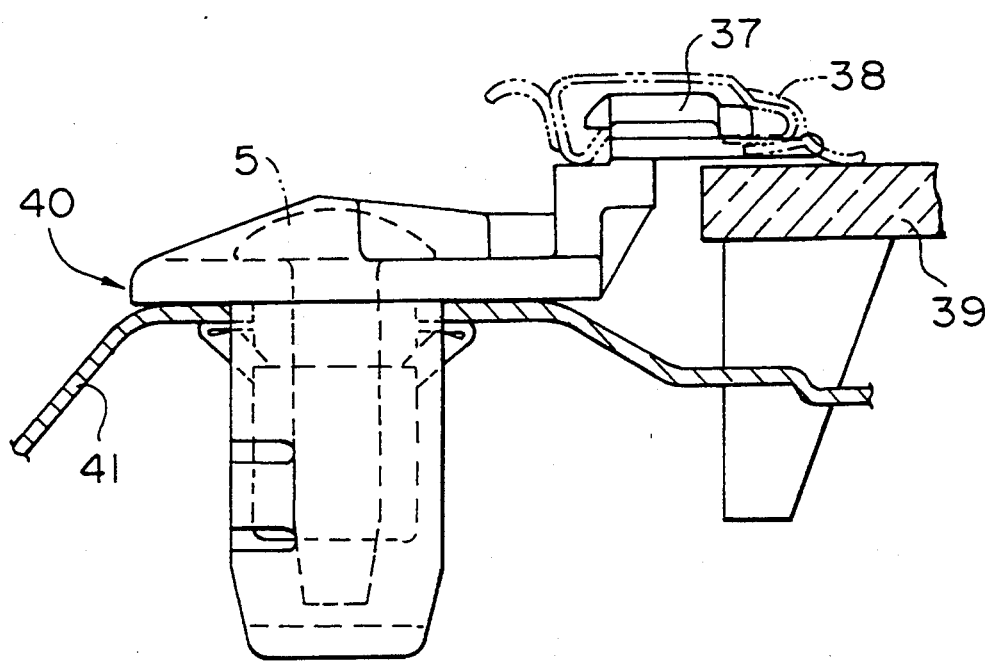

FIG. 16 is a molding held on a panel by means of a screw grommet.

DESCRIPTION OF THE PREFERRED EMBODIMENTS

The present invention is described further by way of embodiments, with reference to accompanying drawings. In FIG. 1 a screw grommet according to the present invention is shown as a whole. FIG. 1 (A) is a plan view of the screw grommet 1, and (B) and (C) are respectively a front view and a side of the screw grommet 1. As shown in FIG. 1 (A) to (C), the screw grommet 1 according to the present invention comprises two members, i.e., a holding member 2 and a grommet member 3. The holding member 2 receives and holds the grommet member 3 in a leg portion 4. A tapping screw 5 as a screw member is screwed in the screw grommet 1. On the bottom side of a flange 6 of the holding member 2, a packing 7 may be provided. The screw grommet 1 according to the present invention is delivered and used in the state that the grommet member 3 is received in the holding member 2. It is also possible to attach the tapping screw 5 and the packing 7 to it, as illustrated, prior to delivery so that the time and trouble to attach the tapping screw at a job site can be saved.

Figure 2:
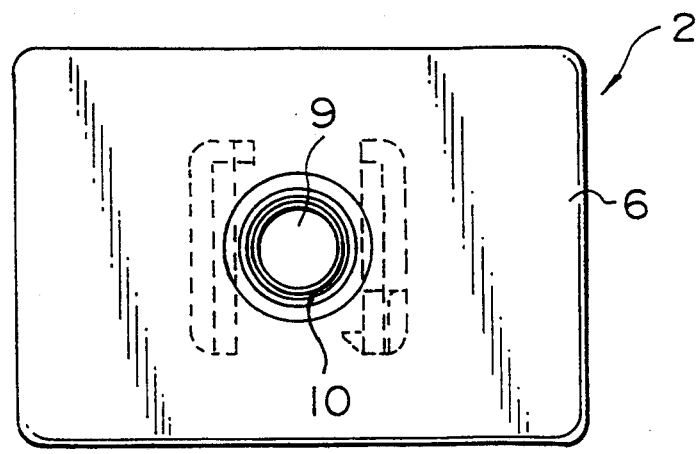
FIG. 2 is a plan view of a holding member of the screw grommet of FIG. 1.
Figure 3:
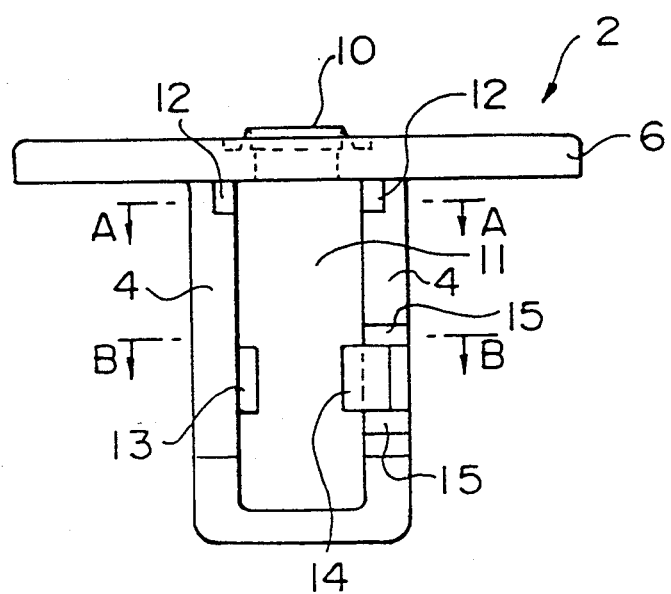
FIG. 3 is a front view of the holding member of FIG. 2.
Figure 4:
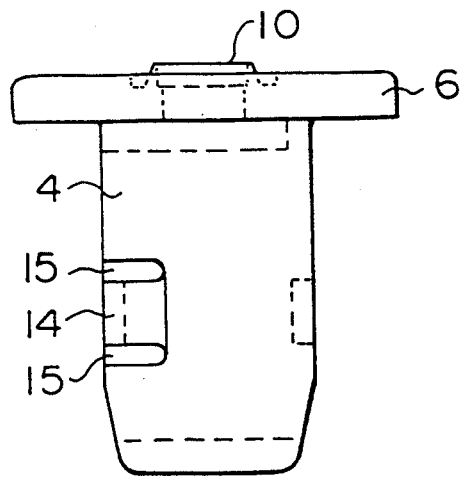
FIG. 4 is a side view of the holding member of FIG. 2.
Figure 5:
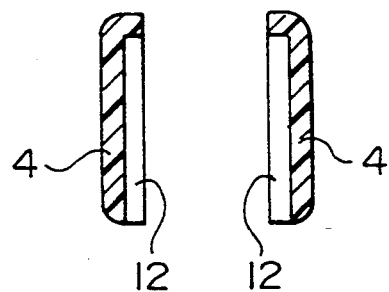
FIG. 5 is a sectional view taken along the line A—A of FIG. 3.
Figure 6:
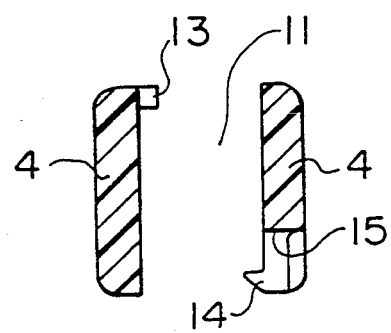
FIG. 6 is a sectional view taken along the line B—B of FIG. 3
Figure 7:
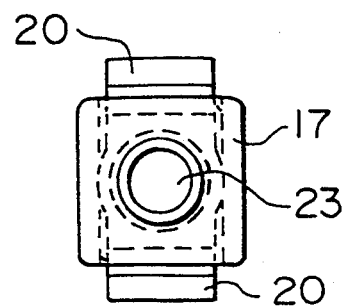
FIG. 7 is a plan view of a grommet member of the screw grommet of FIG. 1.
Figure 8:
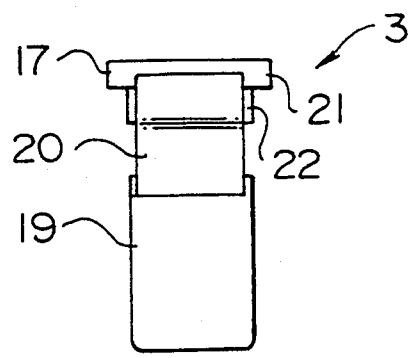
FIG. 8 is a front view of the grommet member of FIG. 7.
Figure 9:
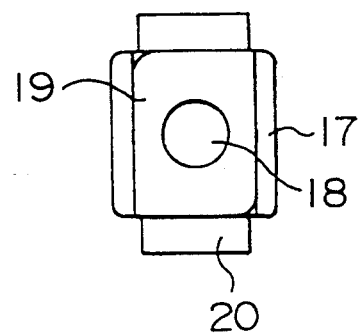
FIG. 9 is a bottom view of the grommet member of FIG. 7.
Figure 10:
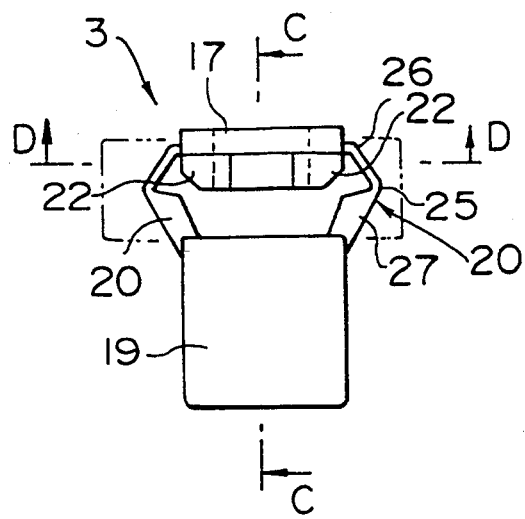
FIG. 10 is a side view of the grommet member of FIG. 7.
Figure 11:
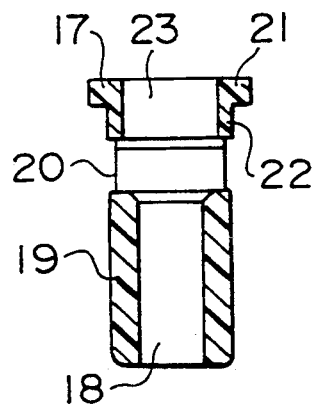
FIG. 11 is a sectional view taken along the line C—C of FIG. 10.
Figure 12:
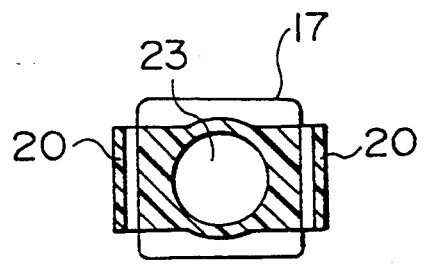
FIG. 12 is a sectional view taken along the line D—D of FIG. 10.

The holding member 2 is described in detail with reference to FIGS. 2 through 6. The holding member 2 comprises the flange 6 which is formed larger than a mounting hole of a vehicle body panel or the like, and the leg portion 4 extending downwardly from the flange 6. The flange 6 is formed with a screw hole 9 which a screw member such as a tapping screw passes through. Round the hole 9, an annular projection 10 to project upwardly is formed to be pressed by the head of a tapping screw to ensure watertightness. As best shown in FIG. 3, the leg portion 4 comprises a pair of plates which extend downwardly from the bottom side of the flange 6, defining a space 11 for receiving the grommet member 3, and a horizontal plate connecting to the lower ends of the two plates. On the inner sides of the leg portion 4 and adjacently to the flange 6, two grooves 12 to receive a head (to be described later) of the grommet member received in the space are formed. At longitudinally middle positions in the leg portion 4, stoppers 13 and 14 are formed as best illustrated in FIGS. 3 and 6. The stopper 13 prevents the received grommet member 3 from getting out. As shown in FIGS. 3 and 4, the first stopper 14 bends outward temporarily when the grommet member 3 is inserted laterally. To enable it to bend, slits 15 are formed above and below the stopper 14.

The grommet member 3 is described in details with reference to FIGS. 7 through 12. The grommet member 3 comprises a head 17 which is fixed so as to be prevented from vertical movements when the grommet member is received in the space 11 of the leg portion 4 of the holding member 2, a tubular portion 19 which is received vertically movably in the space 11 of the leg portion 4 of the holding member 2 and is formed with a hole 18 for a screw member to be screwed thereinto, and a pair of connection arms 20 which connect the tubular portion 19 to the head 17 and whose mid portions bend so as to project radially outwardly when the tubular portion is brought closer to the head.

The head 17 of the grommet member 3 comprises lock portions 21 on the top which project onto both sides to be received in the grooves 12 of the leg portion 4 of the holding member 2 and an abutment portion 22 on the bottom with which the top of the tubular 19 comes in contact. When the grommet member 3 is received in the space 11 of the holding member, the head 17 is prevented from moving vertically so as to limit the lift of the tubular portion 19 to a predetermined height. In the center of the head 17, a hole 23 to be penetrated by a screw member is formed. The tubular portion 19 is angular so as to be inserted easily into the space 11 of the leg 4 of the holding member 2 but not to rotate relatively to the space. In the illustrated embodiment, the screw hole 18 is formed smaller in diameter than the outside diameter of a tapping screw. The size and shape of the hole 18 can be determined to match the coupling force and the like of the screw member.

As illustrated, each connection arm 20 in the normal state bends so that a mid portion 25 project radially outwardly. Portions 26 above the mid portions 25 are formed thin while portions 27 below the mid portions 25 are formed thick. This allows the thin upper portions 25 to press the bottom side of the panel and the thick lower portions to strengthen the pressing when the tubular portion 19 is lifted by means of the screw member and the connection arms are bent. When the tubular portion 19 is lifted, an upper portion of the tubular portion comes in contact with the abutment portion 22 of the head 17 and cannot go higher so that the arms 20 can be prevented from further deformation and the thin upper portions 26 can be prevented from being broken.

Figure 13:
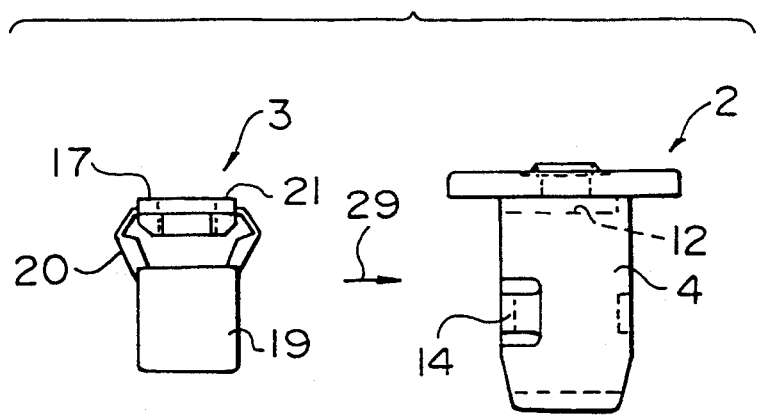
FIG. 13 is an explanatory drawing of the screw grommet of FIG. 1 before assembly.
Figure 14:
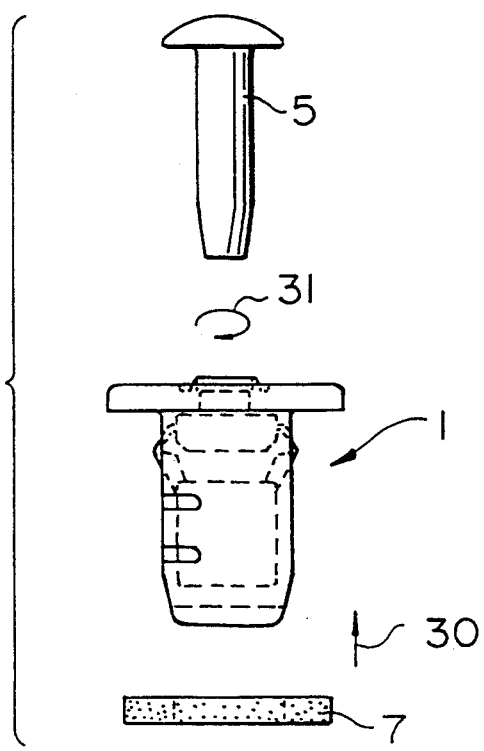
FIG. 14 is an explanatory drawing showing how to assemble a tapping screw and a packing to the screw grommet of FIG. 13.

The screw grommet 1 of the above-described structure is assembled into the state shown in FIG. 1. Its assembly steps are explained with reference to FIGS. 13 and 14. In FIG. 13, the grommet member 3 is pressed into the space of the leg portion 4 of the holding member 2 in the direction indicated by an arrow 29 so that the lock portions 21 of the head 17 can get laterally into the grooves 12 of the leg portions 4. The pressing bends the stopper 14 of the leg portion 4 of the holding member 2 to the outer side momentarily to allow the grommet member 3 to get into the space 11. Then, the stopper 14 returns to the original state and the grommet member 3 is received in the holding member 2. After the receipt, the packing 7, if needed, is attached when it is pushed up from the leg side of the holding member 2 as indicated by an arrow 30 in FIG. 14, and the tapping screw 5 is screwed in as indicated by an arrow 31. This brings the screw grommet in the assembled state of FIG. 1. In this state, the mid portions 25 of the connection arms 20 slightly project from the leg portion 4 of the holding member 2 to enable the screw grommet to be fixed temporarily.

FIG. 15 shows how an ornamental member 34 as a first member is connected to a vehicle body panel 33 as a second member. In this case, the ornamental member 34 is fastened together with the panel 33 and they are considerably thick as a whole. Therefore, the packing 7 is removed. To begin with, in FIG. 5 (A), the ornamental member 34 is positioned to the panel 33 so that their mounting holes are aligned. The leg portion 4 of the holding member 2 of the screw grommet 1, in which the grommet member is already received, is inserted into mounting holes 35 and the screw grommet is temporarily fixed to the panels by means of the mid portions 25 of connection arms 20 slightly projecting from the leg portion 4 of the holding member 2 as shown in (B). Next, as shown in (C), screwing the tapping screw 5 into the grommet member lifts the tubular portion 19 of the grommet member 3 and the connection arms 20 are further bent in their mid portions 25. This causes the thin upper portions 26 to press the bottom side of the panel 33 and the thick lower portions 27 also press to strengthen the pressing by the upper portions. Consequently, the ornamental member 34 is firmly connected to the vehicle body panel 33.

In an embodiment shown in FIG. 16, a molding clip 37 is molded integrally with the flange of the holder member. A molding 38 is attached to the molding clip 37 and the molding 38 is mounted on a window glass 39. This screw grommet 40 is attached to a thin panel 41 and the packing 7 is used. When the tapping screw 5 is screwed in forcibly, the tubular portion 19 of the grommet member is lifted and the connection arms 20 are further bent in their mid portions 25 so that the thin upper portions 26 press the bottom side of a panel 41, which is more strongly pressed by the thick lower portions 27. Accordingly, the screw grommet 40 is firmly connected to the panel 41 and as a result, the molding 38 is also connected to the panel 41 firmly. Thus, even in a case like this in which the panel is thinner than the one shown in FIG. 14, a sufficiently high coupling force is attained. As the head of the tapping screw 5 presses the annular projection 10 of the holding member, watertightness is ensured and still higher watertightness is obtained by the pressing of the packing 7.

Advantageous Effect of the Invention

The screw grommet according to the present invention comprises a grommet member and a holding member to hold the grommet member, and the holding member comprises a flange formed larger than a mounting hole of a second member and a leg portion which extends downward from the flange, is formed with a space in its center, and passes through the mounting hole of the second member so as to extends to the bottom side of the panel. The grommet member comprises a head which is fixed so as to be prevented from vertical movements when received in the leg portion of the holding member, a tubular member which is received vertically movably in the leg portion of the holding member and is formed with a hole into which a screw member is screwed, and a pair of connection arms which connect the tubular portion and the head and bend so as to project radially outwardly in their mid portions when the tubular portion is brought closer to the head. Therefore, the screw grommet can deal with a change in the thickness of panel if a panel having a different thickness is used. Moreover, as the connection arms are bent further when the grommet member is lifted, the coupling force is maintained at a high level. This means there is no need of making a varied types of screw grommets. As a tapping screw can be previously inserted into the screw grommet, the number of assembly steps at a job site can be reduced.

I claim:

1. A screw grommet for connecting a first member to a panel member having a mounting hole therein by the use of a tapping screw, said grommet being adapted for use with a range of panel member thicknesses, said grommet having a flange to be positioned on said panel member and a shank to receive said screw extending in said hole in said panel member, said grommet being connected to said panel member by means of the flange and the diametrical expansion of said shank when said screw is screwed thereinto; characterized in that:

said screw grommet comprises a grommet member and a holding member to hold the grommet member;

said holding member including said flange which is formed larger that said mounting hole in the second member and a leg portion which extends downwardly from said flange, and passes through said mounting hole of said panel member, said leg portion being formed with a space to receive said grommet member;

said grommet member comprising a head which is adapted to be axially interlocked with said leg portion of said holding member, a tubular portion which is received in said leg portion of said holding member, said tubular portion being axially movable and being formed with a hole for the screw member to be screwed thereinto, and a pair of arms, said arms comprising a pair of panel support portions extending from said tubular portion toward said head and flaring outwardly therefrom, said panel support portions having an upper surface facing said panel member to engage and support said panel when said tubular portion is moved toward said panel;

a pair of upper arm portions extending between said head and an outer end of said upper surface to retain said panel support portions with said upper surfaces facing toward said panel, said upper arm portions being of a thickness less than that of the panel support portions so that they are flexible to accommodate any of a variety of thicknesses of said panel member while holding the upper surface of said panel support portions facing said panel member when said tubular portion is moved toward said head.

2. A screw grommet as claimed in claim 1 wherein said tubular portion abuts said head when said screw member is inserted and tightened and wherein said upper arm portions flex to provide full engagement of said panel support portions under said panel.

* * * * *